United States Patent [19]

deJong

[11] 4,132,651

[45] Jan. 2, 1979

[54] SEPARATING DEVICE TO SEPARATE TWO LIQUIDS OF DIFFERENT SPECIFIC GRAVITY

[76] Inventor: Leendert W. C. deJong, Westkade 27, Hellevoetsluis, Netherlands

[21] Appl. No.: 885,871

[22] Filed: Mar. 13, 1978

Related U.S. Application Data

[63] Continuation of Ser. No. 769,212, Feb. 16, 1977, abandoned.

[30] Foreign Application Priority Data

Feb. 19, 1976 [NL] Netherlands ........................ 7601702

[51] Int. Cl.² .................... B01D 17/02; B01D 21/10
[52] U.S. Cl. .................................................. 210/522
[58] Field of Search ........................ 210/521, 522, 84

[56] References Cited

U.S. PATENT DOCUMENTS

| 3,529,728 | 9/1970 | Middelbeek et al. | 210/522 |
| 3,914,175 | 10/1975 | Kunz et al. | 210/521 X |
| 3,933,654 | 1/1976 | Middelbeek | 210/521 |

FOREIGN PATENT DOCUMENTS

| 2201273 | 7/1972 | Fed. Rep. of Germany | 210/522 |
| 6910417 | 1/1971 | Netherlands | 210/522 |
| 7205561 | 10/1973 | Netherlands | 210/522 |
| 7410902 | 8/1974 | Netherlands | 210/522 |

*Primary Examiner*—William A. Cuchlinski, Jr.
*Attorney, Agent, or Firm*—Shapiro and Shapiro

[57] ABSTRACT

A separating device for separating two liquids of different specific gravities employs a basin and a separator unit therein which has flow ways spaced one above the other formed of imperforate, upwardly inclined inverted V-shaped plates for the flow of the liquid of lighter specific gravity toward the apex of each plate and upwardly in the direction of the length of the plates. The inlet for the liquids of different specific gravities is adjacent the lower extremities of the plates and the outlets for the cleaned liquid and for the lighter liquid separated in the separator unit is at the upper extremities of the plates which are near the upper extremities of the wall of the basin.

1 Claim, 2 Drawing Figures

SEPARATING DEVICE TO SEPARATE TWO LIQUIDS OF DIFFERENT SPECIFIC GRAVITY

This is a continuation of application Ser. No. 769,212, filed Feb. 16, 1977 now abandoned.

The invention relates to a separating device for separating two liquids of different specific gravity, for example to clean a liquid by separating from it oil lighter than the liquid to be cleaned. A known form of separator of this type comprises a basin with a separator unit having flow ways for the liquid spaced one above another and formed by inclined plates, the supply for the liquid being at the lower extremities of the plates and the outlets for the cleaned liquid and for the lighter liquid separated in the separator unit being at the upper extremities of the walls of the basin, and an overflow between the separator unit and the outlet for the cleaned liquid.

With such a known device the extremities of the plates at the upper side are provided with tapering fingers with openings therebetween by which a good separation is obtained.

It is an object of the invention to provide a separating device in which this effect is obtained in another way.

To this end according to the invention the inclined plates are of inverted-V-shape and upstream of the separator a preliminary separating means is provided to separate out the easily separated lighter liquid as well as heavier solid particles, as for instance sand.

By this means not only is a good separation obtained, but also a device is provided which may be fabricated inexpensively, because the fabrication of V-shaped plates may be done cheaply. By means of these inverted-V-shaped inclined plates the distance travelled by the lighter liquid will be lengthened because it will flow sideways slantingly under these plates to the apex of the inverted V, enabling the length of the plates to be decreased, and consequently the separator unit may be smaller and cheaper. Moreover, upstream of the separator unit the free liquid which is easy to separate will already have been separated, so that it is possible to further decrease the length of the V-shaped plates on this account.

In a preferred embodiment each of the inverted V-shaped inclined plates ends at its upper extremity in a point. In this way the lighter liquid is guided close to the liquid surface and the cleaned liquid may flow away downwards at both sides of the plates because triangular recesses are formed between the pointed upper ends of the plates and the side walls of the basin. By this a still better separation is guaranteed.

The invention may be carried into practice in various ways, but one specific embodiment thereof, comprising a device for cleaning a liquid by separating from it oil lighter than the liquid to be cleaned, in this case water, will now be described by way of example only and with reference to the accompanying drawings, in which.

Figure 1:
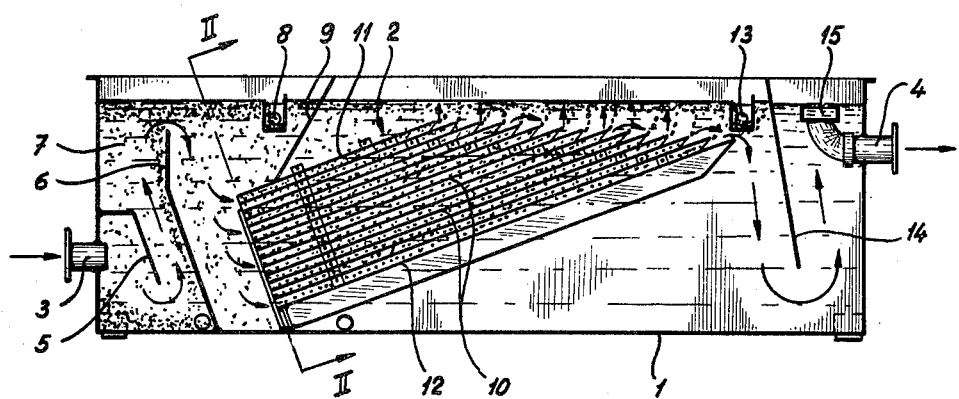
FIG. 1 is a longitudinal section of a separating device.

The oil separating device illustrated comprises a basin 1 with an oil separator unit 2. The basin is provided with an inlet 3 for the liquid to be cleaned and a discharge 4 for the cleaned liquid.

The liquid entering the basin 1 through the inlet 3 first flows under an inclined baffle 5 and then flows into a space between the baffle 5 and a second baffle 6 which is formed in such a way that its lower portion is substantially parallel to the baffle 5 and its upper portion diverges away to form a larger space 7, so that the velocity of the flow of the upwardly flowing liquid to be cleaned decreases as it passes through the space 7. As a result the heavier particles such as sand and the like suspended in the liquid flow will descend, and the free easy-to-separate constituents such as light oil will tend to float upwardly in space. The resultant floating layer of light oil is withdrawn by means of a skimmer 8.

This skimmer 8 is adjusted in such a way that during removal of the oil the thickness of the oil layer remains constant. This can only be done when the viscosity of the oil is not too high. If it is, the oil skimmer 8 has to be turned manually.

Figure 2:
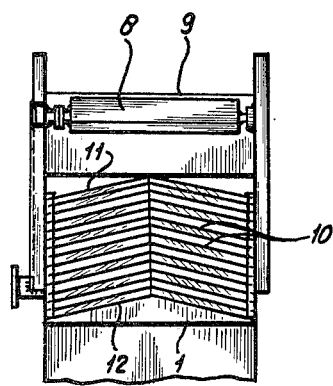
FIG. 2 is a section on the line II—II in FIG. 1.

After this first separation, the now less soiled water flows slowly downwardly between the baffle 6 and a baffle 9 to the entrance of the superior unit proper, 2, after which it will flow upwardly between the inclined separator plates 10. These plates 10, the upper of which is indicated at 11 and the lower of which is indicated at 12, are of inverted-V-shape in section with pointed upper ends, as shown in FIG. 2.

At the entry into the separator unit 2 of the soiled liquid the small droplets of oil will deposit as a mist under the slanting sides of each plate 10.

At a certain stage an oil film will be formed by this continuous mist deposit.

The continuous growing oil film will become thicker and will go in a V-shaped movement to the apex of each plate 10 as the result of the inverted-V-shape of the plates and the angle of about 15 degrees with the horizontal at which the length of the plate package is mounted.

Towards the top of each inverted-V-shaped plate 10, which ends in a point at its upper extremity the oil films collecting under both sides of the plate 10 will be joined to form a stream. At the pointed ends of the V-shaped plates 10 the oil will leave the plates in the shape of big drops. These big drops will rise easily to the surface because of their size.

These drops then again form an oil layer at the surface removed by a second skimmer 13.

The water leaving the separating unit 2 travels down under a diving baffle 14 and then up and out through an adjustable overflow 15, with a great degree of cleanness.

The number of plates 10 and the selected distance of the plates determine the capacity.

The plates may be pushed inwards by means of cams provided on the side walls of the basin so that all plates above the bottom V-shaped plate 12 are removable.

The two skimmers 8 and 13 are connected with each other along a side wall by means of section by which only one outlet tube for the oil is necessary.

The levels of both skimmers 8 and 13 are adjustable by means of tube couplings at both sides beside the skimmers.

The water overflow 15 is adjustable by turning a tube coupling (not shown) provided around the tube after the bend.

It is easy to form the plates 10 into a V-shape.

Baffle 9 is mounted slanting between the side walls to obtain a hoisting facility to mount the long V-shaped plates 10 of the package.

I claim:

1. A separating device for separating two liquids of different specific gravities comprising a basin, a separator unit therein having flow ways spaced one above the other formed of imperforate, upwardly inclined inverted V-shaped plates for the flow of the liquid of lighter specific gravity toward the apex of each plate and upwardly in the direction of the length of the plates, the upper end portions of said inverted V-shaped plates being of pointed form, the inlet for the liquids of different specific gravities being adjacent to the lower extremities of the plates and the outlets for the cleaned liquid and for the lighter liquid separated in the separator unit being at the upper extremities of the plates and at the upper extremities of the wall of the basin, and an overflow weir in the basin between the separator unit and the outlet for the cleaned liquid.

* * * * *